May 28, 1968     S. FOGLIA     3,385,641
FLUID BEARING
Original Filed May 5, 1964
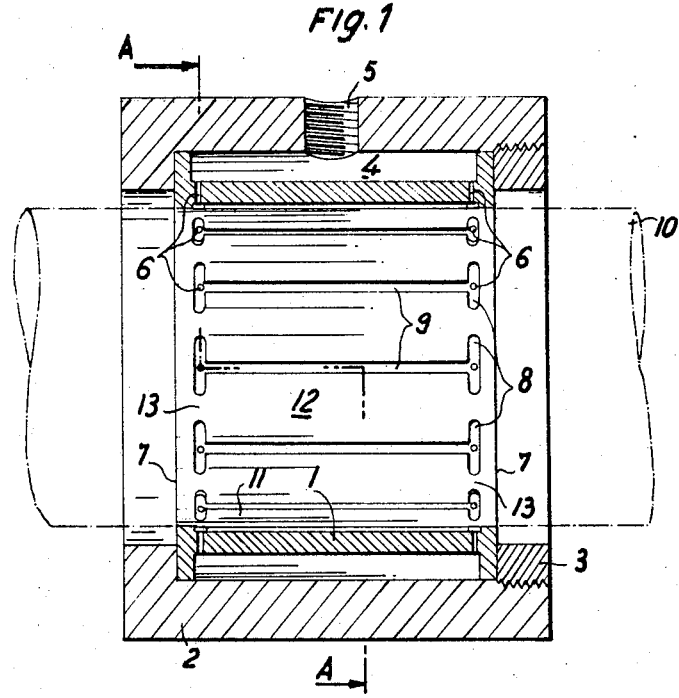
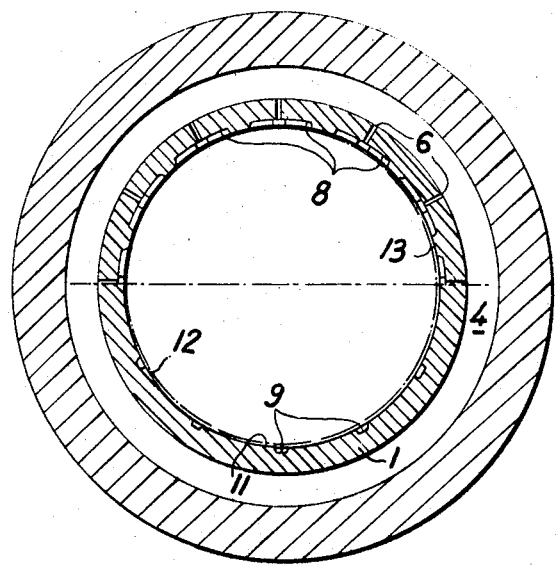

3,385,641
FLUID BEARING
Sebastien Foglia, Verrieres-le-Buisson, France, assignor to Commissariat à l'Energie Atomique, Paris, France
Continuation of application Ser. No. 365,091, May 5, 1964. This application June 21, 1966, Ser. No. 563,014
Claims priority, application France, May 21, 1963, 935,490
1 Claim. (Cl. 308—122)

ABSTRACT OF THE DISCLOSURE

In the wall of the bore of a fluid bearing, having a fluid receiving chamber around the bore, are formed adjacent each end of the bearing a plurality of spaced channels on the same circumference. A port opens between the chamber and the center of each channel. Longitudinal grooves are formed in the wall of the bore extending perpendicularly between the centers of opposite pairs of the channels so that negligible loss of fluid occurs through the short intervals between adjacent channels.

---

The present invention relates to a fluid bearing. In fluid bearings, which are coming into increasingly widespread use for the purpose of supporting and guiding shafts of rotating machines, lubrication is carried out by means of a thin film of gas under pressure.

Fluid bearings usually fall into two main classes: the hydrostatic bearings in which the pressure of gas results from a continuous external feed, and the hydrodynamic bearings in which the pressure is generated by the rotation of the shaft.

The main disadvantages of bearings of the hydrodynamic type lies in their small bearing surface. Their working load cannot as a rule exceed a few hundred grams per square centimeter of bearing surface. Moreover, they operate under satisfactory conditions only when the velocity of rotation of the shaft exceeds a certain value.

As far as the hydrostatic bearings are concerned, their permissible working load C depends essentially on the injection pressure P and on what is conventionally referred-to as the efficiency R of the bearing ($R=C/PS$ S being the projected surface of the bearing on a plane passing through its axis). Their performances and their fields of application differ according to whether they comprise or do not comprise chambers which are hollowed-out in the mass of the material which is employed in the manufacture of the bearing.

As a rule, the efficiency of hydrostatic bearings provided with chambers is higher than that of bearings without chambers but these latter are substantially more stable.

The present invention is intended to combine in a single device the advantages which are attached to each class of bearings referred-to above and consequently to produce better performances and greater versatility than is achieved by bearings which are at present in use.

The invention is intended in particular to overcome the disadvantages of conventional hydrodynamic bearings as regards their small permissible working load and the frictional resistance both at starting and stopping while nevertheless retaining the stability of hydrodynamic bearings of the chamber type.

To this end, the present invention is directed to a fluid bearing comprising a stationary element which delimits a cylindrical bore having a diameter which is slightly larger than that of a shaft to be supported, an annular chamber formed in said element around said bore, means for admitting fluid under pressure in said chamber and ports providing a communication between said bore and said chamber, characterized in that said ports are uniformly spaced around two circumferences of the bore in transverse cross-section, said circumferences being located respectively in the vicinity of the two ends of said bore and each port having its opening substantially at the center of a channel which is cut in the wall of said bore along an arc of the corresponding circumference, said channels being joined to each other in pairs by means of grooves which are cut longitudinally in said wall.

In a preferred mode of practical execution, said stationary element consist of a bearing-block and a bearing-bush which are coaxial with each other and between which is formed said annular chamber.

Reference being made to the accompanying diagrammatic FIGURES 1 and 2, there will now be described below one non-limitative example of construction of the bearing in accordance with the invention.

FIG. 1 is a view in longitudinal cross-section of a fluid bearing in accordance with the invention, FIG. 2 is a view in transverse cross-section taken along the line A—A of FIG. 1.

As appears from the figures, the bearing according to the invention consists of a bearing-bush 1 which is mounted in a bearing-block 2 and fixed therein by means of a nut 3. The internal diameter of the bearing-bush 1 is very slightly larger than that of the shaft 10. The shapes of the bearing-block 2 and of the bearing-bush 1 are such that an annular chamber 4 is formed as a result of their assembly and is connected by means of an opening 5 to a pipe for the supply of fluid under pressure (which has not been shown in the drawings).

The chamber 4 communicates with the internal portion of the bearing-bush 1 by virtue of a certain number of ports such as the ports 6 which are uniformly spaced apart over two circumferences which are located respectively in the immediate vicinity of the edges 7 of said bearing-bush. Each of the aforesaid ports opens into a channel 8 which is cut in the bearing-bush 1 and which extends symmetrically on each side of the port 6 along an arc of the circumference on which said port is located. Those channels which are located on a same circumference do not communicate with each other but are separated by uncut spaces 13. On the other hand, the channels which are located respectively on the two circumferences are joined together in pairs at the levels of the ports by means of longitudinal grooves such as the groove 9. The channels 8 and the grooves 9 define together on the surface of the bearing-bush 1 a series of rectangles, all of which have equal dimensions.

The operation of the bearing which has just been described is as follows:

Since the shaft 10 is initially applied against the bottom of the bearing-bush 1, the fluid under pressure is admitted into the annular chamber 4, penetrates within the bearing-bush through the ports 6 so as to be distributed, first through the channels 8, then through the grooves 9. At a given pressure, the fluid is then dispersed between the bearing-bush 1 and the shaft 10, said shaft being accordingly unseated from the bearing-bush 1.

As a result of the position of the ports 6 and of the configuration of the channels 8 and the grooves 9, fluid screens are formed at the level of said grooves and define, as it were, "chambers" from which the fluid can escape only with difficulty and which are formed between the shaft 10 and the bearing-bush 1 in cylindrical rectangles 12. In fact, the fluid can only flow out to the exterior through the spaces 13 which are formed between the channels 8 and it is even more difficult for said fluid to flow from one chamber to the next by reason of the continuous screens which are formed at the level of the grooves 9.

It should be noted that, whereas it is desirable to reduce to a small value the dimensions of the smooth spaces 13 between the channels 8, said channels must nevertheless be prevented from communicating with each other. If this precaution were not taken, the fluid which is admitted through the ports 6 could in fact rapidly reach through their channels a region in which the clearance between the shaft and the bearing is greater (usually at the top of the bearing), and from this point could therefore escape more easily.

As a rule, the effects of imprisoning of the fluid within the "chambers" are all the more marked, and consequently the efficiency of the device is greater, when the clearance between the bearing-bush and the shaft is smaller. Contrary to the chambers of conventional bearings, those of a bearing in accordance with the invention are formed as a result of unseating of the shaft at the moment of putting under pressure. The lateral "walls" of these "chambers" being solely formed of fluid screens, the "thickness" of said chambers can therefore be reduced to a very small value. As a consequence, the variations in the volume of the chambers which are caused by any possible displacements of the shaft within the bearing will be very substantial, thereby providing the possibility of a very powerful self-regulating action and consequently endowing the entire device with higher impact resistance.

Another important advantage of this bearing lies in its versatility. It can in fact be made to operate under very different pressures, for example if it has to be subjected to variable loads, without thereby impairing its efficiency to any appreciable extent. Under equal load, the consumption of fluid is lower than that of bearings of the prior art and the efficiency is higher.

A very characteristic feature of bearings in accordance with the present invention consists in the fact that they are related to the conventional hydrostatic bearings both for starting and stopping and to the hydrodynamic bearings during normal operation. This possibility eliminates the disadvantages which arise from friction at the time of starting and at the time of stopping of conventional hydrodynamic bearings.

There will now be given by way of example a few results obtained from a bearing of the type which has been described above and illustrated in the accompanying drawings, and which has the following characteristics:

Internal diameter: 55 mm.
Length: 44 mm.
Number of longitudinal grooves: 12
Dimensions of grooves and channels: width: 1 mm.; depth: 0.05 mm.
Distance between extreme edges of two consecutive channels: 2.5 mm.
Distance between centers of ports and the rims of the bearing-bush: 3 mm.
Diameter of the feed orifices: 0.2 mm.
Total clearance between shaft and bearing-bush (measured with micrometer-gauge, components separated): $45\mu$.

The efficiencies obtained are as follows:

| | Separation | Load, $g./cm.^2$ | Efficiency, Percent |
|---|---|---|---|
| Case 1 | $2\mu$ | 465 | 75.4 |
| | $2\mu$ | 85 | 64 |
| Case 2 | $11.25\mu$ (¼ total clearance) | 657 | 55.2 |
| | $11.25\mu$ | 122 | 46.8 |

The efficiency of conventional bearings under identical conditions would be of the order of 40% (case 1) and 20% (case 2).

It will be understood that the invention is not limited in any sense to the example of embodiment or to the mode of application as hereinbefore described or as illustrated, but also extends among others to guiding and supporting bearings for sliding components as well as to thrust bearings. In a general manner, the invention meets with an application whenever it is desired to reduce the friction between two smooth surfaces in sliding relation irrespective of the nature and geometry of said surfaces, whether such surfaces are plane surfaces (translational and/or rotational motion) cylindrical surfaces having any directrix (translational motion), surfaces of revolution (rotational motion).

In the majority of cases, the ports for the injection of fluid as well as the grooves which provide preferential paths for this latter are formed in the stationary element for greater convenience; however, it may be necessary in certain applications to make provision for these arrangements on the moving member. This applies especially in the case of objects or vehicles which are intended to move without friction along a track or smooth surface.

What I claim is:
1. Fluid bearing comprising a stationary element, a cylindrical bore in said element having a diameter slightly larger than that of a shaft to be supported therein, an annular chamber formed in said element around said bore, means for admitting fluid under pressure in said chamber, ports between said bore and said chamber uniformly spaced around two circumferences of said bore in right angle transverse cross-section, said circumferences being located respectively adjacent the two ends of said bore, a channel for each of said ports spaced from adjacent ones of said channels in the wall of said bore along an arc of the corresponding one of said circumferences, each of said ports opening substantially at the center of the respective one of said channels and longitudinal grooves in said wall perpendicularly connecting the centers of opposite pairs of said channels whereby said transverse channels are provided with fluid directly from the ports and fluid is supplied at the same time to said longitudinal grooves forming a fluid screen opposing the loss of fluid from said longitudinal grooves and only negligible loss of fluid takes place through the short intervals between two transverse channels on the same circumference.

References Cited

UNITED STATES PATENTS

| 1,906,715 | 5/1933 | Penick. | |
| 2,539,072 | 1/1951 | Gordon et al. | 308—240 |
| 2,549,659 | 4/1951 | Brendel | 308—240 |

FOREIGN PATENTS

| 295,405 | 1/1929 | Great Britain. |

MARTIN P. SCHWADRON, *Primary Examiner.*

FRANK SUSKO, *Examiner.*

DAVID J. WILLIAMOWSKY, *Assistant Examiner.*